Aug. 27, 1968 A. S. NEMY 3,398,444
HARD TOOTH GEARS AND METHOD OF MAKING
Filed Jan. 18, 1966 2 Sheets-Sheet 1
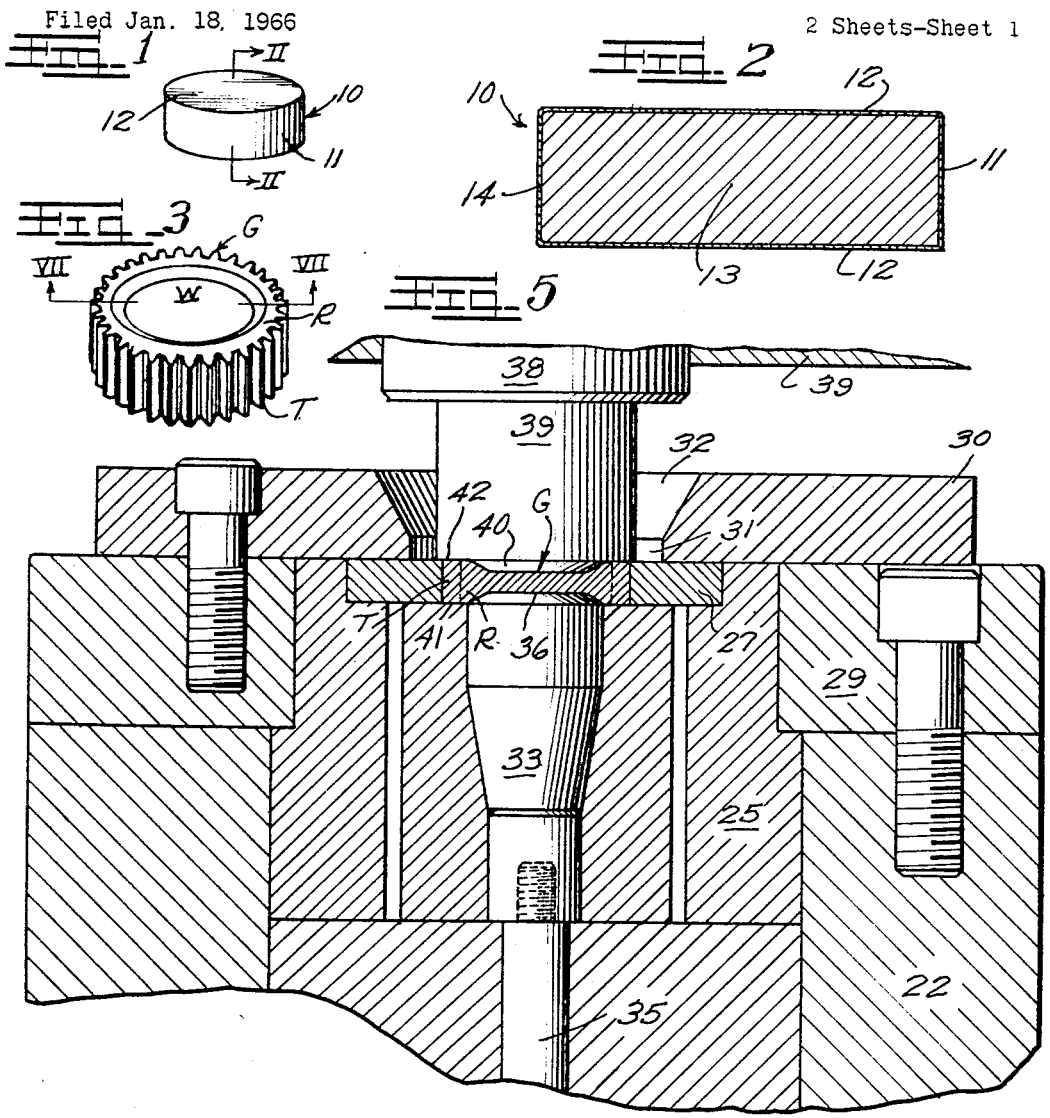
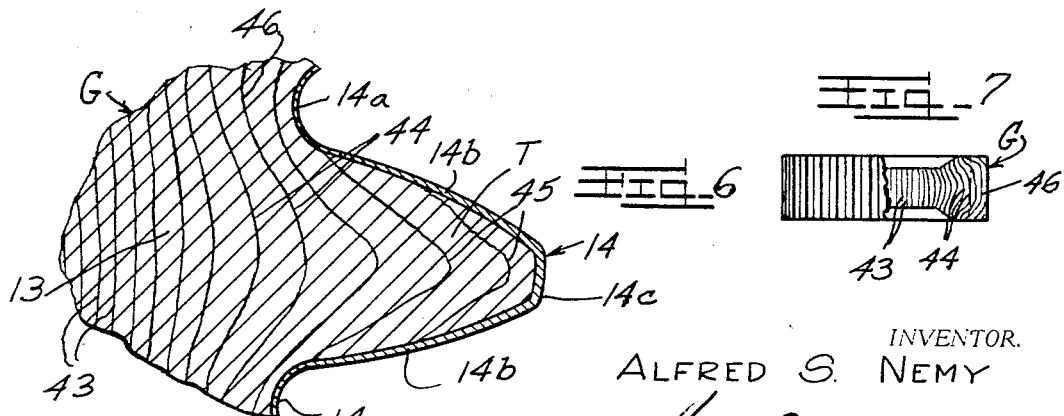
INVENTOR.
ALFRED S. NEMY
BY Hill, Sherman, Meroni, Gross & Simpson
ATTORNEYS

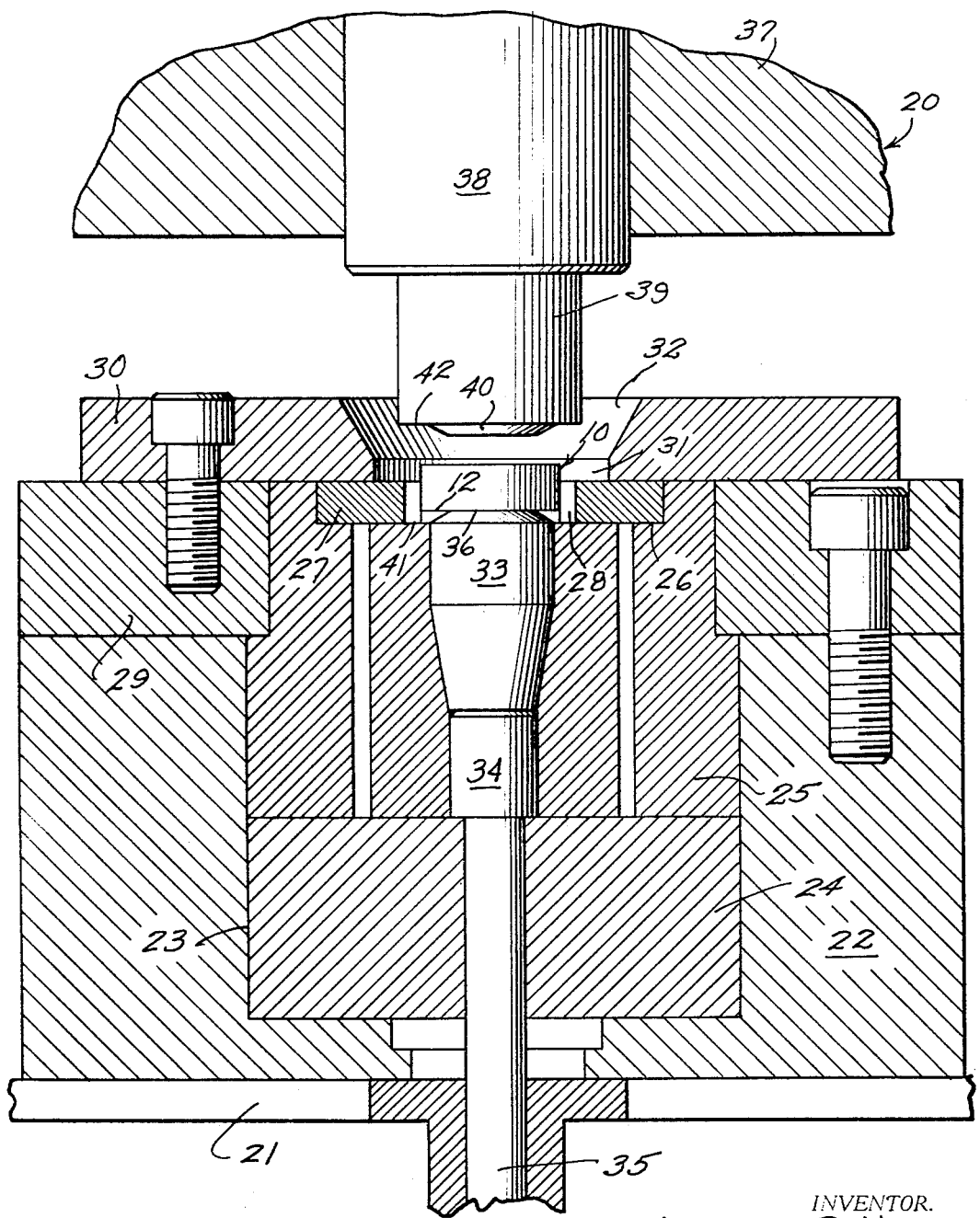

United States Patent Office 3,398,444
Patented Aug. 27, 1968

3,398,444
HARD TOOTH GEARS AND METHOD
OF MAKING
Alfred S. Nemy, Lyndhurst, Ohio, assignor to TRW Inc.,
Cleveland, Ohio, a corporation of Ohio
Filed Jan. 18, 1966, Ser. No. 521,257
6 Claims. (Cl. 29—159.2)

ABSTRACT OF THE DISCLOSURE

A radially toothed gear and the method of making which has the steps of carburizing a gear blank at a temperature of about 1550° F. to 1800° F. to a desired case depth, die forging of the blank into a gear at a forging temperature from 1400° F. to 1700° F. by radial extrusion of the blank thereby providing a gear which has grain flow lines defining the sides of the teeth which are relatively more compressed in the root areas than in other areas of the teeth and which has a hardenable case of selective depth which is thicker at the crown and sides of the radial teeth than at the root areas, thereafter quenching the forged gear and tempering at temperatures of around 300° F., and finally finish machining the gear.

This invention relates to toothed articles such as gears, turbine wheels and the like having hardened tooth surfaces and grain flow configurations increasing the strength and wearability of the articles. The invention includes a method of making such articles by die forging surface hardenable blanks. Specifically, the invention deals with case hardened toothed members such as gears and turbine wheels having a nonuniform distribution of the hardened case to increase the strength and wearability of the members, and includes a method of die forging case hardenable slugs to produce such members.

According to this invention, metal blanks having hardenable surfaces, i.e. surfaces capable of being hardened by subsequent treatment, are die forged into toothed articles so as to provide a nonuniform distribution of the hardenable surface metal while developing grain flow lines which enhance the strength and wearability of the teeth. The forged article is then subjected to a treatment for hardening the hardenable surface. The invention will be hereinafter specifically described as embodied in case hardened metal gears, but it will be understood that the invention is not limited to this specifically described and illustrated embodiment, the invention being generally applicable to the die forging of surface hardenable blanks to produce finished articles of increased wearability and strength.

Heat treated, flame hardened, induction hardened and even case hardened gears are known, but in each instance, the hardened surfaces are of substantially uniform depth and uniformly distributed, thereby having hardened areas subject to cracking and fatigue under stress. The present invention now provides surface hardened gears with a nonuniform distribution of the hard surface areas so as to provide the hard surfaces where wear resistance is encountered while at the same time relieving nonwearing surfaces to maintain toughness and malleability at the areas where stress occurs. The gears of this invention have thick case hardened surface areas around those portions of the teeth which are subject to wear and high compressive loading and have thin hardened surface areas at the roots of the teeth to maintain the toughness of the body metal at the root diameter. Further, the gears of this invention have grain flow lines following the tooth profile which are not destroyed by heat treatment such as occurs in the conventional hardening of finished gears.

It is then an object of this invention to provide forged members having hardened surfaces distributed in such a manner as to provide maximum hardness depth at the wearable zones and lessened hardness depth at the highly stressed zones for maintaining the toughness of the body metal at these high stressed zones.

Another object of this invention is to provide toothed members such as gears, turbine wheels and the like having deep hardened surfaces at zones of high wear and shallower hardened surfaces at zones of high stress.

Another object of the invention is to provide surface hardened gears with maximum depth hardened surfaces around the teeth areas thereof and minimum depth hardened surfaces adjacent the root areas thereof.

A still further object of this invention is to provide die forged case hardened gears with nonuniformly distributed carburized casings to provide hardened areas where needed and tough areas where needed.

A further object of the invention is to provide a method of die forging surface hardenable metals to distribute the surface hardening as desired in the finished article.

Another object of the invention is to provide a method of die forging toothed articles such as gears and turbine wheels wherein a surface hardenable blank is die forged at minimum forging temperatures of the metal to distribute the hardenable case of the blank, as desired, in the finished article while producing the finished shape, which is then subjected to a hardening treatment for developing the final hard surfaces.

Another object of the invention is to provide a method of die forging gears which includes carburizing the case of a metal blank to a desired depth followed by a die forging of the blank into a gear shape to distribute the carburized case to a maximum thickness in the tooth area and a minimum thickness in the root area.

A specific object of the invention is to provide a gear with a nonuniformly distributed hardened case and a forged grain flow line configuration imparting maximum strength to the gear.

Other and further objects of this invention will be apparent to those skilled in this art from the following detailed description of the annexed sheets of drawings, which, by way of a preferred example only, illustrate one embodiment of the invention.

On the drawings:

FIGURE 1 is an isometric view of a metal slug or biscuit from which the gears of this invention are formed;

FIGURE 2 is a transverse sectional view of the slug of FIGURE 1 taken along the line II—II of FIGURE 1, and showing the uniform depth of the hardened case of the blank;

FIGURE 3 is an isometric view of a finished radial gear, forged from the slug of FIGURES 1 and 2;

FIGURE 4 is a fragmentary vertical cross-sectional view, with parts in elevation, of a die forging apparatus acting on the slug of FIGURE 1 to form the radial gear of FIGURE 3, and illustrating the apparatus in opened position prior to die forging the slug;

FIGURE 5 is a view similar to FIGURE 4, but illustrating the apparatus in closed position and showing the gear of FIGURE 3 in transverse vertical section;

FIGURE 6 is a fragmentary enlarged cross-section of a tooth of the gear of FIGURE 3 showing the grain flow configuration and the thickness distribution of the case or hardened surface area of the tooth; and FIGURE 7 is a transverse sectional view taken along the line VII—VII of FIGURE 3, and illustrating the grain flow lines in the gear.

As shown on the drawings:

The reference numeral 10, in FIGURES 1 and 2, designates generally a solid cylindrical case hardenable metal slug to form the starting blank for the gears of this invention. The slug 10 has a straight cylindrical side wall 11 and flat top and bottom faces 12. As illustrated, the slug is sized to be compressed axially and expanded radially to form the finished gear. As shown in FIGURE 2, the slug 10 has a central mian body 13 with a hardenable case or cover 14 of uniform depth. The body is composed of a carburizing type steel such as AISI 9310; 1140; 8620; 4130, etc.

The steel body is exposed to a carburizing atmosphere which can be developed from gases or easily vaporized hydrocarbon liquids. Natural gases and propane are preferred, and to prevent the formation of free carbon (soot) on the metal surface, a diluent such as air or manufactured gas is added. The ratio of principal carrier gases to carburizing gas is about 6–9:1, although it can be much larger. The maximum rate at which carbon can be added to steel is limited by the rate of diffusion of carbon in austenite and this diffusion rate increases greatly with temperature. The rate of carbon addition at 1700° F. is about 40% greater than at 1600° F. Therefore, it is preferred to conduct a carburizing operation at temperatures of from 1700° F. to 1800° F. to obtain deep case hardenable surfaces. For shallower case hardenable surfaces, temperatures of around 1500° F. to 1600° F. can be used since the case depth can be more accurately controlled at these lower temperatures. Since carburizing is a diffusion process, the carburizing time will vary. For example, at 1700° F. the case depth will be approximately 0.035 inch after two hours, 0.071 inch after eight hours, 0.10 inch after sixteen hours, and so on up to 0.15 inch after thirty-six hours. It has been found that desired case depths for gears range from about 0.050 to 0.080 inch and carburizing times of from about four to ten hours are required to produce such case depths at temperatures around 1700° F. with lesser times required for treatment at higher temperatures.

After the hardenable case or cover 14 is produced to the desired depth, the blank is either immediately forged while still at the carburizing temperature or is slowly cooled to room temperature after the carburizing treatment so that the case will not be hardened. If the carburized part is slowly cooled to room temperature, it is then reheated to a forging temperature of 1450° F. to 1700° F., depending on the hardening characteristic and forgeability of the particular grade of steel and is die forged.

As shown in FIGURE 4, the case hardenable blank or slug 10, at the desired forging temperature, is deposited in the forging apparatus 20. The apparatus 20 includes a bed 21, a die holder 22 on the bed having a well 23 receiving a support pad 24 and a die 25 with an open top recess 26 in wihch is mounted an internally toothed die ring 27 having a ring of gear forming teeth or ribs 28 around the inner periphery thereof. The die 25 is clamped in the holder 22 by a clamping ring 29 and the toothed die ring 27 is held in the die 25 by a superimposed cover ring 30 having a central opening 31 with a beveled mouth 32 for admitting the slug 10 into the die ring 27.

The die 25 has a bore receiving a die post 33 bottomed on a platform 34 adapted to be actuated by a knock-out pin 35 to raise the post 33 through the die ring 27 for ejecting a finished gear. The upper end of the post 33 has a raised tapered nose 36 supporting the bottom face 12 of the blank 10 at a level slightly above the bottom of the die ring 27.

The apparatus 20 includes a ram 37 with a punch adapter 38 on which is suspended a punch 39 having a cylindrical outer diameter greater than the inner diameter of the die ring 27 so as to overlie the ring, but small enough to fit freely through the aperture 31 in the clamping ring 30. The leading end of the punch 39 has a raised beveled nose 40 complementary with the nose 36 of the post 33.

When the apparatus is moved to its closed position of FIGURE 5, the post nose 36 and the ram nose 40 squeeze the central portion of the blank 10 to move the blank metal radially into conformity with the die ring 27. The die 25 has a flat face 41 surrounding the post nose 36, and the punch 39 has an opposing flat face 42 surrounding the punch nose 40. These two faces, 42 and 41, confine the blank within the die ring 27 and the metal is moved both axially and radially into full conformity with the ring to form the finished gear G of FIGURE 3. The gear G has a reduced thickness central web W surrounded by a rim R from which radial gear teeth T project. The finished gear G is removed from the apparatus 20 at the completion of the impact stroke thereof by raising the ram 37 to move the punch back to its open position. The knock-out pin 35 is then raised to lift the die post 33, thereby forcing the gear G out of the die ring 27.

The gear forging G, upon removal from the die ring 27, is subjected to a hardening treatment including quenching in oil, salt solution, or water to room temperatures followed by a tempering treatment. Typical examples of suitable hardening treatments include a direct quench in agitated oil to room temperatures followed by a tempering treatment at about 300° F.

A typical example of a direct-quench method includes carburizing of AISI 8620 steel at 1700° F. for eight hours, forging into gear shape, quenching in agitated oil to room temperatures, and tempering at 300° F. The reheat procedure includes carburizing an AISI 8620 steel at 1700° F. for eight hours, slowly cooling to room temperature, preferably at rate less than 100° F. per second, reheating to 1550° F., forging into gear shape, quenching an agitated oil, and tempering at 300° F.

It will be noted that the die forging is effected at temperatures which do not exceed the carburizing temperatures. These minimum forging temperatures develop the grain flow lines and nonuniformly distribute the carburized case, but since the forging is carried out before the case is hardened, the grain flow is not impeded by the case.

The forging operation occurs in a single stroke of the apparatus 20 and the metal flow of the blank 10 is such as to produce the grain flow line configuration shown in FIGURES 6 and 7 while also flowing the case or cover 14 of the blank to thin down the depth of the case at areas such as the root areas subjected to high stress and to thicken the depth of the case in the side faces and tip of the teeth where maximum wear occurs. A shown in FIGURE 6, the grain flow lines in the inner body of the gear are generally in the form of concentric rings 43. As the flow lines approach the root diameter of the gear, they begin to bow outwardly and stretch, as illustrated at 44, into the tooth T. As these lines approach the tip of the tooth, they become more peaked, as illustrated at 45. At the root diameter, these flow lines, 44 and 45, are squeezed together in the area 46.

The case 14, due to this working of the blank metal, is thinned down at the root areas and somewhat accumulated or thickened along the side surfaces of the tooth and at the tip of the tooth. As shown in FIGURE 6, the original case 14 is thin at the root areas 14a and thicker along the sides of the gear tooth at 14b, becoming thickest at 14c at the tip of the tooth. This distribution of the case is highly desirable to provide the hard wear resisting faces 14b and 14c at the areas of the tooth subjected to the most wear. At the same time, the thinned case areas 14a at the root of the gear tooth are highly desirable because these areas are subjected to maximum stress and the toughness of the main body 13 of the gear metal should be maintained. Little or no machining is needed to finish the gear G. If drilling of the web W is required to mount the gear on a shaft, it will be noted from FIGURE 7 that the bore will be defined by the sides of the grain bands and will thus resist wear.

As shown in FIGURE 7, the finished gear G is free from two sidedness, the grain flow lines bowing uniformly in an axial direction as well as in a radial direction to define the surfaces of the gear with their sides only.

Although minor modifications might be suggested by those versed in the art, it should be understood that I wish to embody within the scope of the patent granted hereon, all such modifications as reasonably and properly come within the scope of my contribution to the art.

I claim as my invention:

1. The method of making radial gears which comprises case carburizing a solid cylindrical steel slug at temperatures of about 1550° F. to 1800° F. in a carburizing atmosphere until a case of desired depth envelops the slug, die forging the cylindrical slug at minimum forging temperatures to compress the slug axially and expand the slug radially into the shape of a radial gear with gear teeth surrounding a central body portion, redistributing the case hardenable cover of the slug to provide thick case hardenable portions along the sides of the teeth and thin case hardenable portions at the roots of the teeth, and quench hardening the gear.

2. The method of making case hardened, die forged radial gears which comprises case carburizing a cylindrical steel slug to a desired depth, die forging the slug into radial gear configuration at minimum forging temperature, squeezing the slug axially and simultaneously extruding the periphery of the slug radially during the die forging to squeeze the case cover into the sides of the teeth away from the roots of the teeth, thereby thickening the case depth along the sides of the teeth while thinning the case depth in the root areas of the teeth, forming grain flow lines during said forging operation around the tooth profile to define the sides of the teeth with the sides of the grain flow lines and the root areas of the teeth with closely packed grain flow lines, maintaining the minimum forging temperature of the slug throughout the forging operation, oil quenching the forged gear, tempering the forged gear at temperatures of around 300° F., and finish machining the gear.

3. The method of making a gear which comprises forming a hardenable case of substantial uniform depth on a metal blank in complete enveloping relation around the blank by carburizing at suitable temperatures, die forging the case hardenable blank into a shape with a main body having portions radiating therefrom, flowing the case of the blank during the forging operation to thin down the case at the base areas of the radiating portions, subjecting the article to a quenching and tempering treatment for hardening the case, and boring a central axial aperture therethrough.

4. The method of making case hardened gears which comprises case carburizing a steel slug to a depth of 0.05 inch to 0.08 inch at temperatures around 1700° F. for about eight hours, die forging the slug at temperatures not above about 1700° F. nor below about 1400° F. to provide a gear shape and to nonuniformly distribute the case of the slug to provide thin areas at the roots of the teeth and thickened areas along the sides of the teeth while creating a grain flow line configuration throughout the gear composed of generally circular lines of successively increasing diameter and bowed outwardly in the teeth to define the sides of the teeth with their sides only while being compressed into close relationship in the roots of the teeth, and thereafter quench hardening and tempering the gear.

5. A case hardened radially extruded die forged gear which comprises a body of carburizable steel, said body having a case hardened skin enveloping the body, said body having a generally cylindrical central portion and teeth radiating from said central portion around the periphery thereof, said skin having minimum depth portions at the root areas between the teeth and maximum depth portions along the sides and tip ends of the teeth, said steel having grain flow lines of generally coaxial circular configuration around the central portion of the body and bowed outwardly into the teeth surrounding the body for defining the teeth with the sides of the grain flow lines only, and said grain flow lines being relatively more compressed in the root areas of the teeth than in the outer portions of the teeth for enhancing the root strength of the gear.

6. A gear or the like which comprises a one piece tough steel body case carburized and quench hardened having the hard carburized case enveloping the tough body, said body having a generally cylindrical central portion and gear teeth radiating from the periphery thereof, circular grain flow lines of successively increasing diameters throughout the body of the gear and bowed outwardly into the radiating teeth to define the teeth with the sides of the grain flow lines only, said grain flow lines being relatively more compressed in the root areas between the teeth than in other areas of the teeth, and said carburized case having a maximum depth along the sides of the gear teeth and a minimum depth at the root areas, whereby the gear will resist stresses and wear.

References Cited

UNITED STATES PATENTS

| 1,493,211 | 5/1924 | Link | 29—159.2 X |
|---|---|---|---|
| 1,632,533 | 6/1927 | Brauchler | 29—159.2 |
| 1,710,526 | 4/1929 | Witherow | 29—159.2 |
| 1,716,637 | 6/1929 | Hovey | 29—159.2 |
| 2,285,575 | 6/1942 | Elbertz | 72—376 |
| 2,964,838 | 12/1960 | Schober | 29—159.2 |
| 3,258,834 | 7/1966 | Rork | 29—159.2 |

THOMAS H. EAGER, *Primary Examiner.*